United States Patent
Ševčenko et al.

(10) Patent No.: US 12,175,225 B2
(45) Date of Patent: Dec. 24, 2024

(54) SYSTEM AND METHOD FOR BINARY CODE DECOMPILATION USING MACHINE LEARNING

(71) Applicant: UAB 360 IT, Vilnius (LT)

(72) Inventors: Aleksandr Ševčenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/087,379

(22) Filed: Dec. 22, 2022

(65) Prior Publication Data

US 2024/0211225 A1    Jun. 27, 2024

(51) Int. Cl.

| | |
|---|---|
| *G06F 8/41* | (2018.01) |
| *G06F 8/51* | (2018.01) |
| *G06F 8/53* | (2018.01) |
| *G06F 8/74* | (2018.01) |
| *G06N 3/02* | (2006.01) |
| *G06N 3/08* | (2023.01) |
| *G06N 20/00* | (2019.01) |
| *G06F 21/56* | (2013.01) |

(52) U.S. Cl.
CPC .............. *G06F 8/53* (2013.01); *G06N 20/00* (2019.01); *G06F 8/41* (2013.01); *G06F 8/51* (2013.01); *G06F 21/563* (2013.01); *G06N 3/08* (2013.01)

(58) Field of Classification Search
CPC ..... G06F 8/53; G06F 8/41; G06F 8/51; G06F 21/563; G06N 20/00; G06N 3/08
See application file for complete search history.

(56) References Cited

U.S. PATENT DOCUMENTS

| | | | | |
|---|---|---|---|---|
| 10,656,940 | B1 * | 5/2020 | Hogan | G06F 8/41 |
| 11,487,522 | B1 * | 11/2022 | Singh | G06F 8/53 |
| 2016/0267270 | A1 * | 9/2016 | Lee | G06F 21/564 |
| 2021/0011694 | A1 * | 1/2021 | Ni | G06F 8/53 |
| 2021/0048993 | A1 * | 2/2021 | Burke | G06F 21/565 |
| 2021/0149788 | A1 * | 5/2021 | Downie | G06F 11/3604 |
| 2022/0121429 | A1 * | 4/2022 | Haile | G06N 3/08 |
| 2022/0358214 | A1 * | 11/2022 | Anderson | G06F 21/52 |
| 2023/0214197 | A1 * | 7/2023 | Perez | G06F 8/35 |
| | | | | 717/144 |

(Continued)

OTHER PUBLICATIONS

Shuai Wang et al., In-Memory Fuzzing for Binary Code Similarity Analysis, 2017 IEEE, [Retrieved on Jul. 30, 2024]. Retrieved from the internet: <URL: https://ieeexplore.ieee.org/stamp/stamp.jsp?arnumber=8115645> 12 Pages (319-330) (Year: 2017).*

*Primary Examiner* — Anibal Rivera
(74) *Attorney, Agent, or Firm* — Moser Taboada (57) ABSTRACT

Systems and methods for decompiling binary code or executables are provided herein. In some embodiments, a method of training a machine learning algorithm for decompiling binary code into readable source code includes collecting a data set of source code and at least one element associated with the source code; providing binary code using the data set; training a model configured to decompile the binary code into source code using the data set by: decompiling the collected binary code into intermediate source code; comparing the source code in the data set with the intermediate source code; and updating the model and repeating the training if the source code in the data set differs from the intermediate source code by more than a threshold amount.

20 Claims, 5 Drawing Sheets

(56) References Cited

U.S. PATENT DOCUMENTS

2023/0236813 A1* 7/2023 Strenski .............. G06F 8/447
717/137
2023/0251856 A1* 8/2023 Ni ...................... G06N 3/0464
717/120

* cited by examiner

SYSTEM AND METHOD FOR BINARY CODE DECOMPILATION USING MACHINE LEARNING

FIELD

This disclosure relates generally to computer security, and more particularly to improving production of a readable programming language code (source code) from the binary code via machine translation through decompiling.

BACKGROUND

To study malware and its effects, it may be useful to be able to study the source code from which the malware was compiled. However, malware circulates often as compiled code or executables, not source code. Thus, to facilitate studying malware, in the current state of the art, machine learning (ML) code decompiling systems are employed to decompile code into source code. Such state of the art ML code decompiling systems, however, rely on a rule-based translation approach along with human intervention. Such code decompiling activity can create significant disadvantages such as: decompilation with errors, incomplete results (i.e., incomplete source code), and use of significant amount of human resources. The use of human resources is especially relevant since reading the binary code is extremely difficult and only possible with the involvement of reverse engineering specialists.

Therefore, there is a need for improved methods and apparatuses for improving decompiling systems that can avoid or eliminate the above-noted disadvantages of existing code decompiling systems.

SUMMARY

Systems and methods for decompiling binary code or executables are provided herein. In some embodiments, a method of training a machine learning algorithm for decompiling binary code into readable source code includes collecting a data set of source code and at least one element associated with the source code; providing binary code using the data set; training a model configured to decompile the binary code into source code using the data set by: decompiling the collected binary code into intermediate source code; comparing the source code in the data set with the intermediate source code; and updating the model and repeating the training if the source code in the data set differs from the intermediate source code by more than a threshold amount. Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, and systems) for decompiling binary code and executables and the training of machine learning models for decompiling binary code and executables. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the disclosure use a solution that works with downloaded files from the Internet, which can include malicious content. Malicious files may include content (i.e., code) that a user would deem unimportant and/or would cause harm to their user device (e.g., malware, viruses, etc.).

Systems and methods in accordance with this disclosure can decompile binary code and executables using a trained machine learning model. For example, a central server may receive an executable file or a binary code segment identified within a file. Also, a central server may receive identifying information associated with the executable file or the binary code segment. The information may include a compiler type and compiler flags used to generate the executable file or the binary code segment. The central server may decompile the executable or the binary code segment using the compiler and the compiler flags to generate readable source code. The decompiling includes processing the executable or the binary code segment using a machine learning algorithm. By using the trained machine learning algorithm, human resources to study binary code or executables can be eliminated.

Also, in some embodiments, the machine learning algorithm may be trained by collecting a data set of binary code and/or executables that is compiled using a compiler, compiler flags, and original source code and training a model configured to decompile the collected binary code into source code using the compiler and compiler flags by: decompiling the collected binary code into intermediate source code using the sequence-to-sequence model, compiler, and compiler flags; compiling the intermediate source code using the compiler and complier flags to generate an updated binary code; and comparing the collected binary code with the updated binary code. Also, the machine learning algorithm may be trained by updating the model and repeating the training if the collected binary code differs from the updated generated code by more than a threshold amount.

If the collected binary code does not differ from the updated generated code by more than a threshold amount, the trained machine learning algorithm can be used to decompile binary code or executables as discussed above.

Details of such systems, apparatuses, and methods are described in detail below with respect to the figures.

Figure 1:
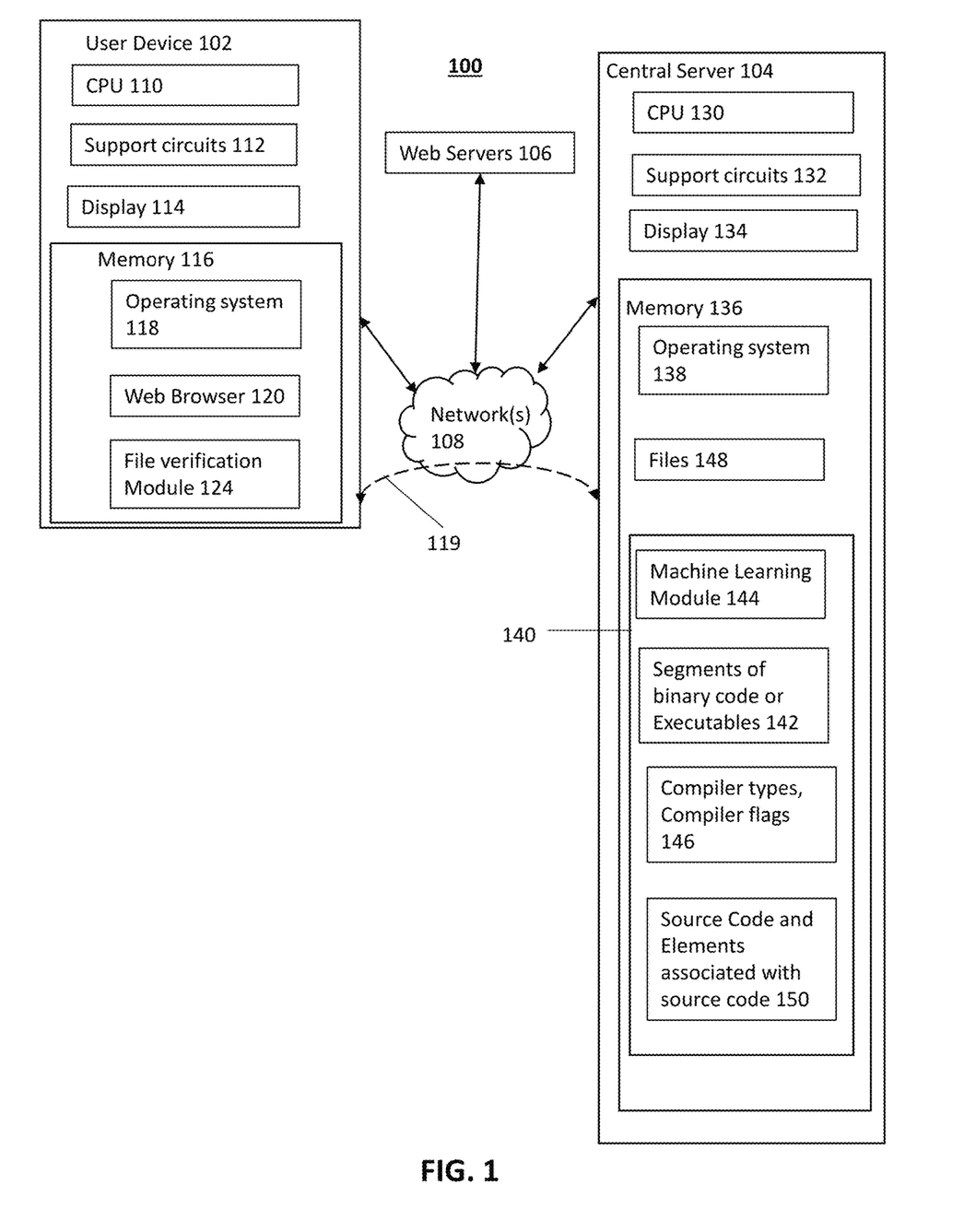
FIG. 1 depicts a high-level block diagram of an embodiment of a network architecture of a system for decompiling binary code and executables in accordance with the present principles.

FIG. 1 depicts a block diagram of a system for decompiling binary code and executables 100 in accordance with at least one embodiment of the disclosure. The system 100 includes a plurality of user devices 102 (one is shown in FIG. 1), a centralized server 104, and a plurality of web servers 106 (one is shown in FIG. 1) communicatively coupled via one or more networks 108. In embodiments, the centralized server 104 is configured to communicate with the user device 102 via networks 108 as discussed in greater detail below.

The networks 108 comprise one or more communication systems that connect computers by wire, cable, fiber optic, and/or wireless link facilitated by various types of well-known network elements, such as hubs, switches, routers, and the like. The networks 108 may include an Internet Protocol (IP) network, a public switched telephone network (PSTN), or other mobile communication networks, and may employ various well-known protocols to communicate information amongst the network resources.

The end-user device or edge device (also referred throughout as "user device") 102 comprises a Central Processing Unit (CPU) 110, support circuits 112, display device 114, and memory 116. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. In some embodiments, the memory 116 comprises an operating system 118, and a web browser 120. The memory 116 may also include a transparent file verification module 124.

The centralized server 104 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138. In some embodiments, the memory 136 includes a decompilation module 140 and files 148 which may have been downloaded from the internet by users devices 102 and received by central server 104 via communication connection 119 through networks 108. The decompilation module 140 may include a machine learning module 144, and executables 142 and/or segments of binary code, which may be extracted from the files 148, in the form of a database, file, or other storage structure. Also, the decompilation module 140 may include information such as compiler type and compiler flags 146 used to compile the segments of binary code or executables. The decompilation module 140 also includes a machine learning module 144 that can execute a machine learning algorithm or model to decompile segments of binary code or executables, such as the segments of binary code and executables 142. At least some of the segments of binary code or executables 142 and the compiler types and compiler flags 146 may represent a data set that is used as training data to train the machine learning algorithm or model of the machine learning module 140. The decompilation module 140 may also include source code and at least one element associated with the source code 150. The element may include at least one of a programming language associated with the source code, a compiler and version associated with the source code, target triplets, a compiler type associated with the source code (e.g., such as an alternative to the compiler name and version), or compiler flags. In some embodiments, the source code and at least one element associated with the source code 150 may represent a data set that is used as training data to train the machine learning algorithm or model of the machine learning module 140.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and the like.

The web browser 120 is a well known application for accessing and displaying web page content. Such browsers include, but are not limited to, Safari®, Chrome®, Explorer®, Firefox®, etc. Executables or files containing binary code may be downloaded to and stored on the user devices 102 using the web browser 120. The user device 102 may send executables and/or files containing binary code to the central server 104 to train the machine learning algorithm of the decompilation module 140. This may be performed by multiple user devices 102 periodically, such as every 24 hours or every week.

In operation, in some embodiments as described above, when a user device 102 downloads a file from the Internet, a transparent file verification module 124 running on the user device 102 may perform a verification process on the user device 102. The file verification module 124 may process the file for verification by the central server 104 to predict whether or not the file is malicious based on machine learning algorithms and trained models on the central server 104.

The central server 104 may make a maliciousness determination of the downloaded file and may classify the downloaded file as a known malicious or non-malicious file and store the downloaded file in the file storage 148 of the memory 136 for later use training the machine learning module 144. Also, such classification of the downloaded file 148 may include identifying binary segments and executables from the downloaded files as well as identifying compiler types and compiler flags for the identified binary segments and executables. The identified binary segments and executables 142 and compiler types and compiler flags 146 may be stored in memory 136. As discussed herein, the stored segments of binary code and/or executables 142, compiler types and compiler flags 146 can be used in the inventive methods described herein to train the machine learning algorithm or model of the machine learning module 144 and, once trained, decompile other segments of binary code or executables.

In some embodiments, the machine learning model or algorithm used by the machine learning module 144 may include a multi-layer neural network comprising nodes that are trained to have specific weights and biases. In some embodiments, the machine learning algorithm employs artificial intelligence techniques or machine learning techniques to determine source code from segments of binary code or executables. In some embodiments, machine learning techniques that can be applied to learn commonalities in binary code or executables, include regression methods, ensemble methods, or neural networks and deep learning such as 'Se2oSeq' Recurrent Neural Network (RNNs)/Long Short Term Memory (LSTM) networks, Convolution Neural Networks (CNNs), Encoders and/or Decoders (including Transformers), graph neural networks applied to the abstract syntax trees corresponding to the malicious URLs, and the like.

Figure 2:
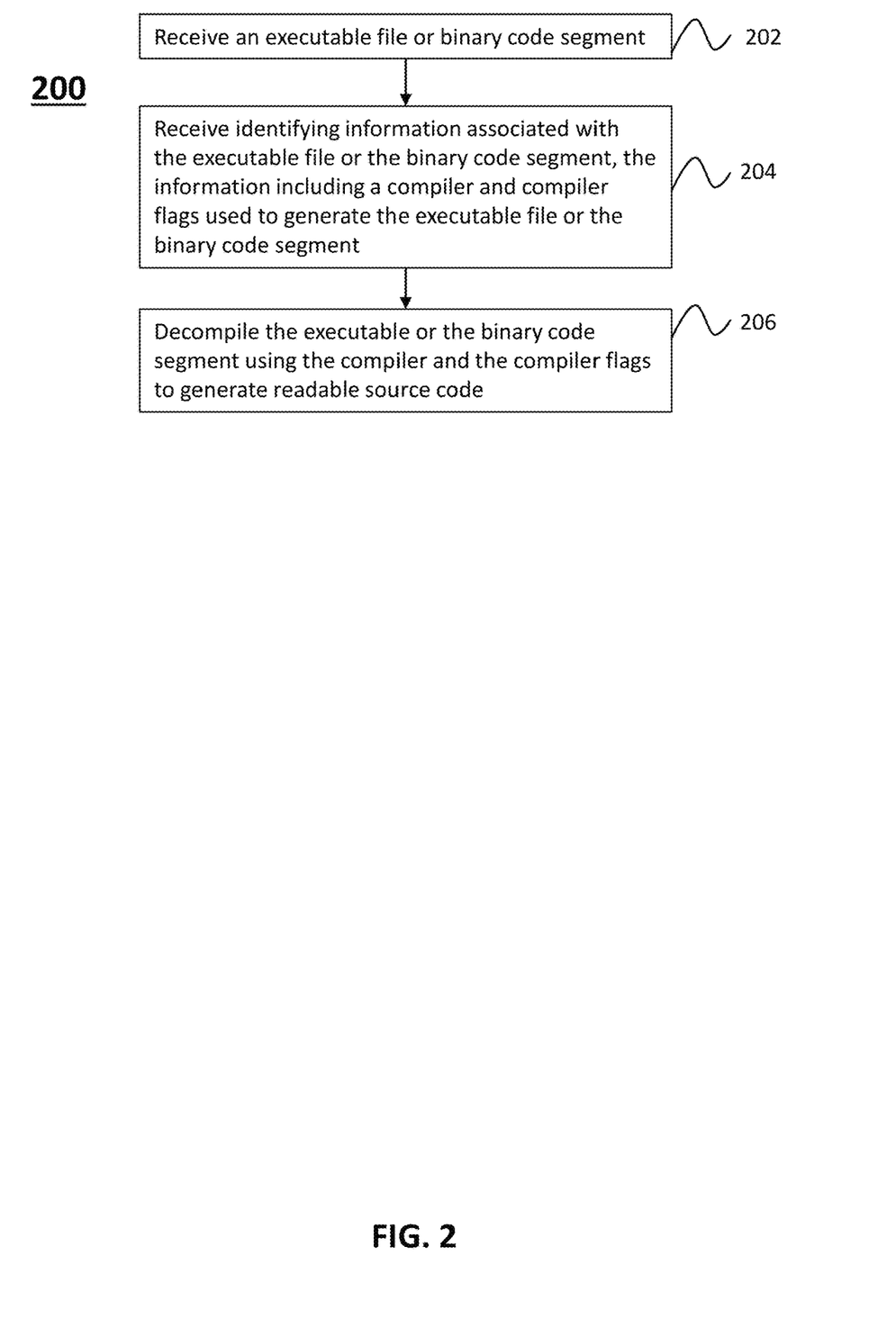
FIG. 2 depicts a flow diagram of an embodiment of a method for decompiling binary code and executables, in accordance with the present principles.

FIG. 2 illustrates an example flow diagram representing a method 200 described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 shows a flow diagram of the example method 200 of decompiling binary code and executables in accordance with the present principles. Such a method 200 may begin at step 202 by receiving an executable file or a binary code segment 142 identified within a file. At step 204, identifying information associated with the executable file or the binary code segment 142 is received. The information may include a compiler type and compiler flags 146 used to generate the executable file or the binary code segment 142. At step 206, the executable or the executable or binary code segment 142 is decompiled using the compiler and the compiler flags 146 to generate readable source code. Such decompiling includes processing the executable or the binary code segment 142 using a trained machine learning algorithm or model of the machine learning module 144 along with the compiler type and the compiler flags 146.

Figure 3:
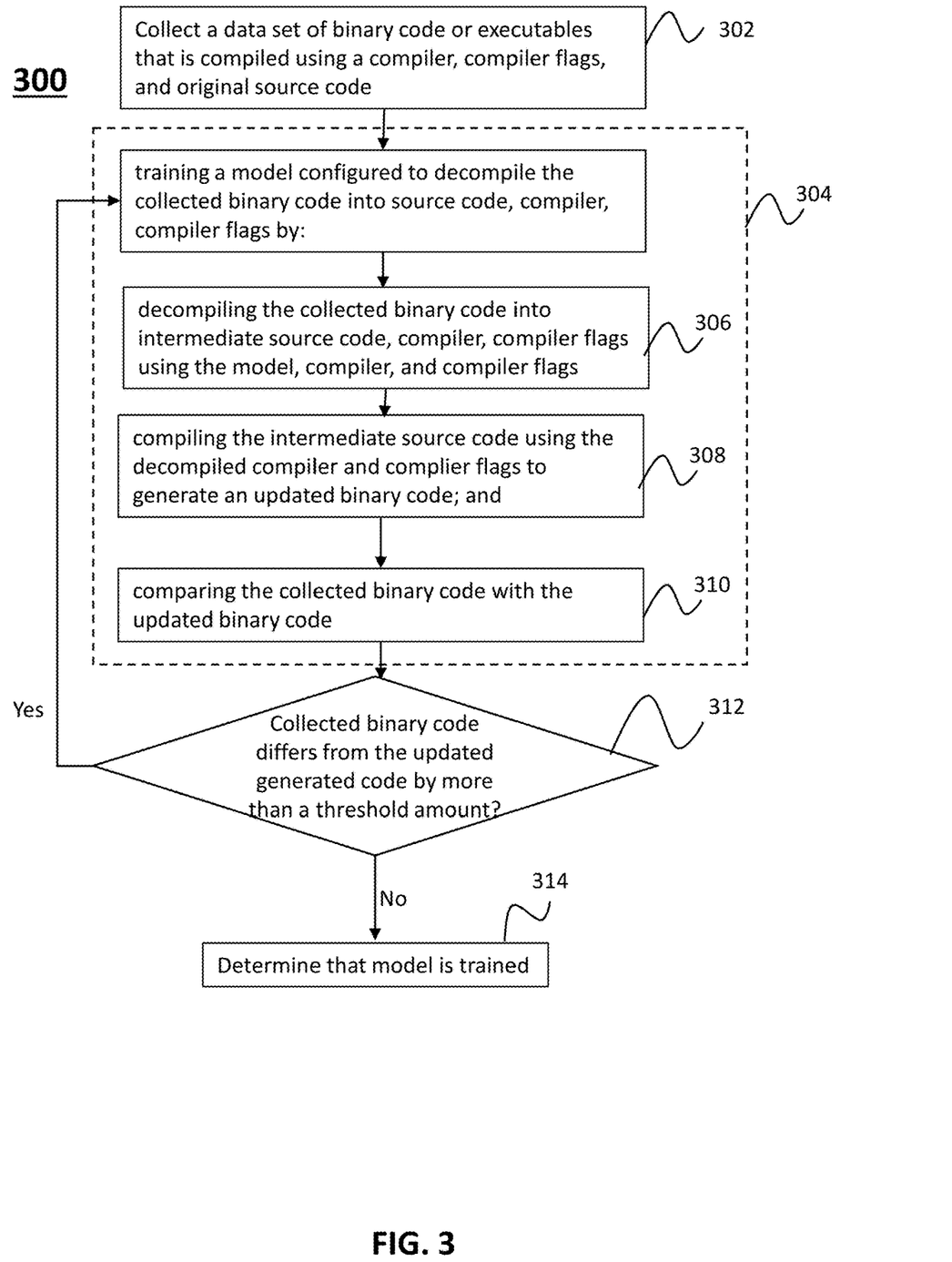
FIG. 3 depicts a flow diagram of an embodiment of a method for training a machine learning algorithm for decompiling binary code and executables, in accordance with the present principles.

FIG. 3 illustrates an example flow diagram representing a method 300 of training the machine learning algorithm or model of the machine learning module 144 for decompiling binary code into readable source code, compiler, and compiler flags. Such a method 300 may begin at step 302 by collecting a data set of binary code or executables that is compiled using a compiler, compiler flags, and original source code. The data set may be stored as binary code segments and executables 142 in memory 136 as described above. At step 304, a model configured to decompile the collected binary code segment or executable into source code, compiler, and compiler flags using the compiler and compiler flags 146 may be trained. For example, as shown in FIG. 3, such training may include decompiling the collected binary code into intermediate source code, compiler, and compiler flags using the model, compiler, and compiler flags at step 306; compiling the intermediate source code using the compiler and complier flags to generate an updated binary code at step 308; and comparing the collected binary code with the updated binary code at step 310. At step 312, the model may be updated and the training at step 304 may be repeated if the collected binary code differs from the updated generated code by more than a threshold amount. Otherwise, if the collected binary code does not differ from the updated generated code by more than a threshold amount, the training process may end at step 314 and the trained machine learning model may be used to decompile executables or the binary code segments as discussed above in connection with method 200.

In some embodiments, the model is a sequence-to-sequence machine learning model. Also, in some embodiments, the threshold amount includes an error rate. Comparing may include comparing a fuzzy hash of the collected binary code to a fuzzy hash of the updated generated code. A difference between such fuzzy hashes (e.g., TLSH hash difference) may be measured and compared to the threshold. Alternatively, comparing may include executing the collected binary code while collecting first log data, executing the updated generated code while collecting second log data, and comparing the first log data with the second log data. For example, executing the collected binary code may include running the collected binary code with first predefined conditions and executing the updated generated code may include running the updated generated code with second predefined conditions. For example, external API calls made by running the collected binary code and the updated generated code, as well as any arguments passed may be logged and a difference between the logs can be measured (e.g., based on the number of lines) to quantify the difference between the collected binaries and the updated generated code. Also, comparing first log data with the second log data may include hashing the first log data and the second log data and comparing a hash of the first log data and a hash of the second log data to measure a difference between the two hashes for comparison to the threshold.

In some embodiments, it may be possible to update or adjust the threshold amount used in the training method. For example, if it is determined that the source code generated cannot adequately be interpreted by a human reviewer, it may be possible to reduce the threshold to train the model with a tighter tolerance to generate more readable source code.

Figure 4:
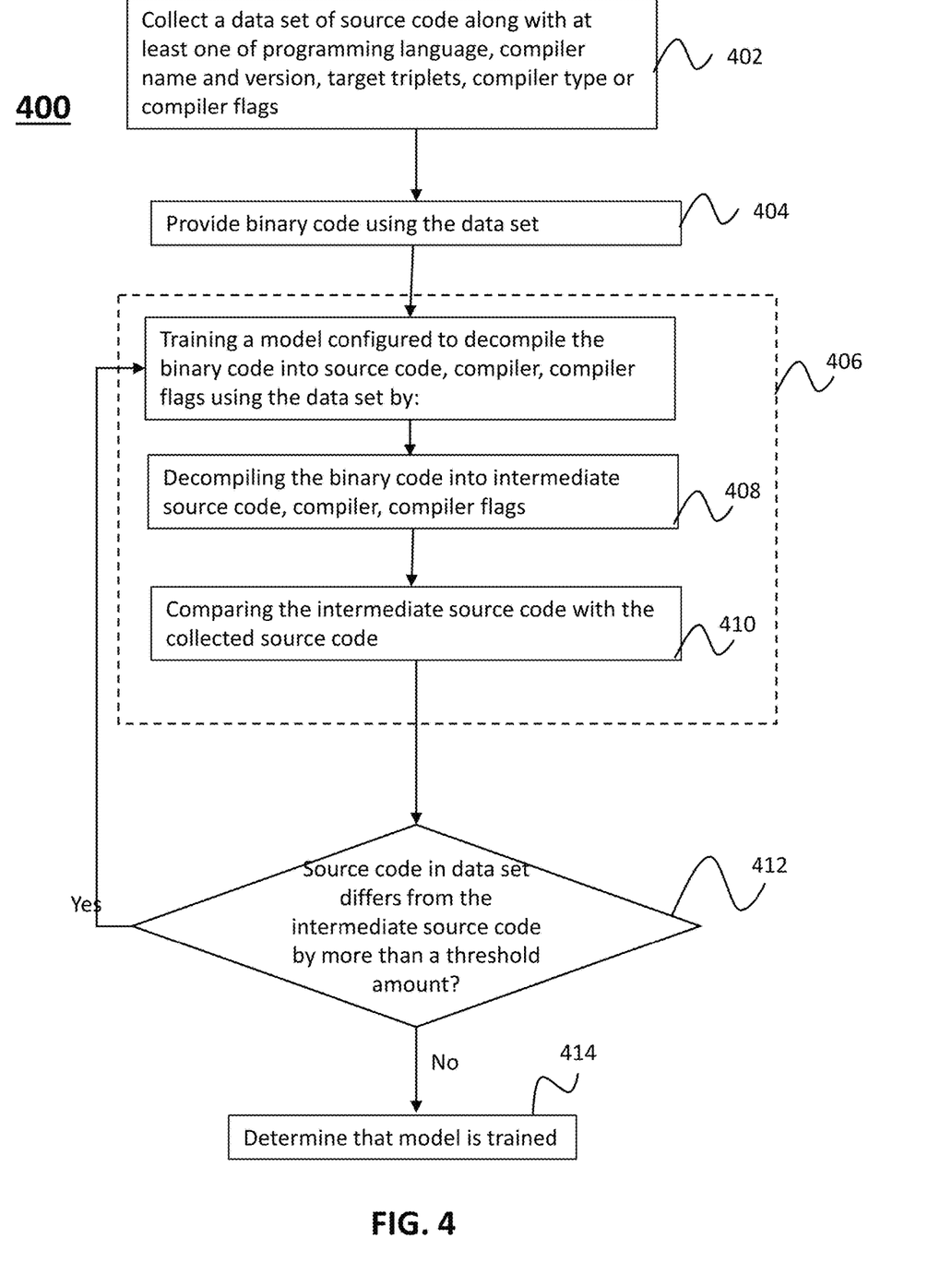
FIG. 4 depicts a flow diagram of another embodiment of a method for training a machine learning algorithm for decompiling binary code and executables, in accordance with the present principles.

FIG. 4 illustrates an example flow diagram representing a method 400 of training the machine learning algorithm or model of the machine learning module 144 for decompiling binary code into readable source code. The method 400 may begin at step 402 by collecting a data set that includes source code and at least one element associated with the source code. The at least one element may include at least one of a programming language associated with the source code, a compiler and version associated with the source code, target triplets, a compiler type associated with the source code (e.g., such as an alternative to the compiler name and version), or compiler flags. The data set may be stored in memory 136 as described above. Optionally, the data set may be pre-processed by renaming variables, functions, or entity names to generic ones. At step 404, binary code is provided using the data set. The binary code may be generated or separately prepared. For example, if the data set includes source code and a compiler, the binary code may be generated by compiling the source code using the associated compiler in the data set. At step 406, a sequence-to-sequence model may be fed the data set and the binary code and trained. For example, as part of the training, at step 408, the binary code, compiler, and compiler flags may be decompiled back into intermediate source code along with any other elements of the data set. Also, as part of the training, at step 410, the intermediate source code may be compared to the source code of the data set, for example by using a loss function, to determine an amount of difference between the intermediate source code and the source code in the data set.

At step 412, the model may be updated and the training at step 406 may be repeated if the source code of the data set differs from the intermediate source code by more than a threshold amount. Otherwise, if the source code of the data set does not differ from the intermediate source code by more than the threshold amount, the training process may end at step 414 and the trained machine learning model may be used to decompile executables or the binary code segments as discussed above in connection with method 200.

In some embodiments, the model is a sequence-to-sequence machine learning model. Also, in some embodiments, the threshold amount includes an error rate. Comparing may include comparing a fuzzy hash of the source code of the data set to a fuzzy hash of the intermediate source code. A difference between such fuzzy hashes may be measured and compared to the threshold.

In some embodiments, it may be possible to update or adjust the threshold amount used in the training method. For example, if it is determined that the intermediate source code generated cannot adequately be interpreted by a human reviewer, it may be possible to reduce the threshold to train the model with a tighter tolerance to generate more readable intermediate source code.

Figure 5:
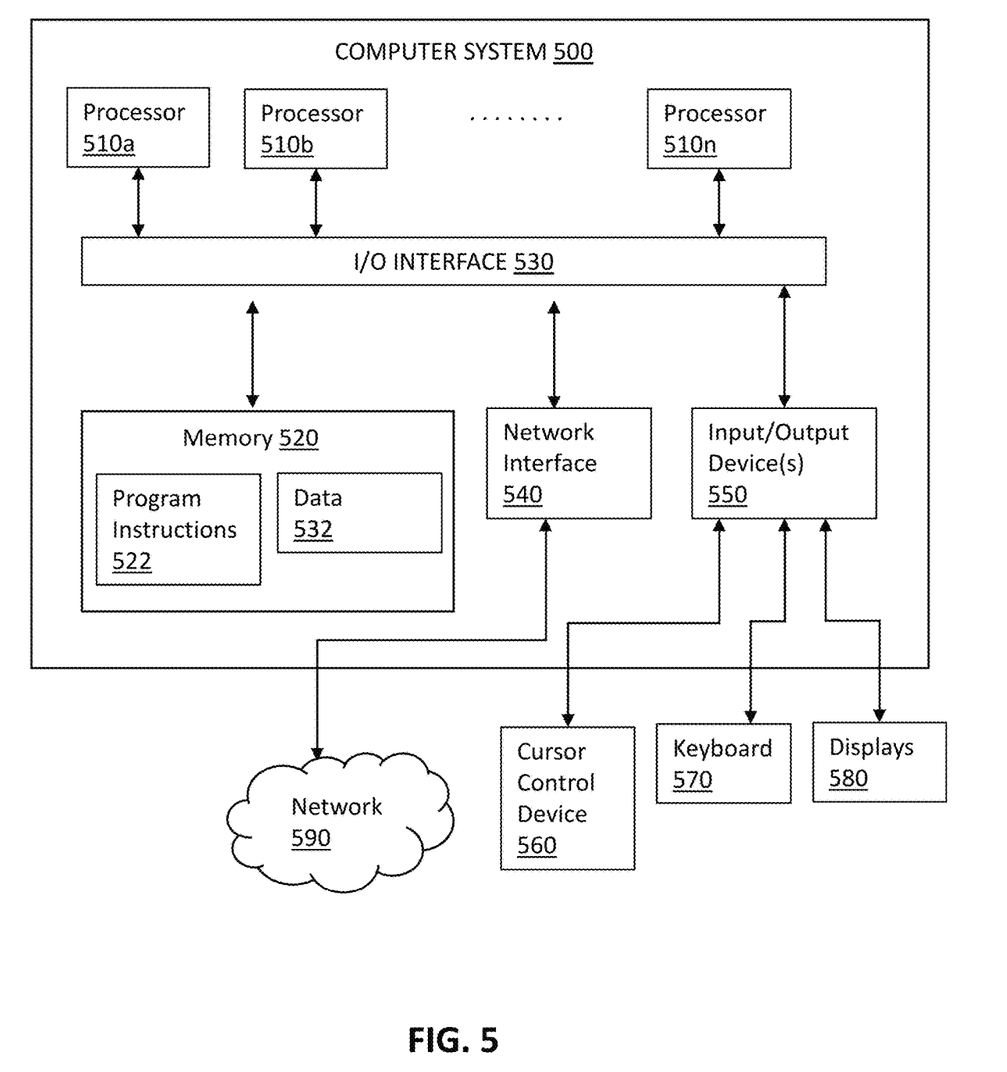
FIG. 5 depicts a high-level block diagram of a computing device suitable for use with embodiments for decompiling binary code and executables in accordance with the present principles.

FIG. 5 depicts a computer system 500 that can be utilized in various embodiments of the invention to implement the computer and/or the display, according to one or more embodiments.

Various embodiments of method and system for training a machine learning algorithm for decompiling binary code into readable source code, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality, or method of the above-described embodiments. In the illustrated embodiments, computer system 500 may be configured to implement the methods 200, 300, and 400 as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 540, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 400 and other devices attached to a network (e.g., network 590), such as one or more external systems or between nodes of computer system 400. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowcharts of FIGS. 2-3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into submodules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A method of training a machine learning algorithm for decompiling binary code into readable source code, the method comprising:
  collecting a data set of source code and at least one element associated with the source code;
  providing binary code using the data set;
  training a model configured to decompile the binary code into source code using the data set by:
    decompiling the collected binary code into intermediate source code;
    comparing the source code in the data set with the intermediate source code; and
    updating the model and repeating the training if the source code in the data set differs from the intermediate source code by more than a threshold amount.
B. The method of clause A, wherein the model is a sequence-to-sequence model.
C. The method of clauses A or B, wherein the threshold amount includes an error rate.
D. The method of any of clauses A-C, wherein comparing includes comparing a fuzzy hash of the source code of the data set to a fuzzy hash of the intermediate source code.
E. The method of any of clauses A-D, wherein the at least one element includes a programming language associated with the source code, a compiler name and version associated with the source code, target triplets, a compiler type associated with the source code, or compiler flags.
F. The method of any of clauses A-E, wherein providing binary code using the data set includes compiling the source code in the data set using the at least one element.
G. The method of any of clauses A-F, wherein the source code in the data set is compared with the intermediate source code with a loss function.
H. A method of decompiling binary code comprising:
  receiving an executable file or a binary code segment identified within a file;
  receiving identifying information associated with the executable file or the binary code segment, the information including a compiler and compiler flags used to generate the executable file or the binary code segment;
  decompiling the executable or the binary code segment using the compiler and the compiler flags to generate readable source code,
  wherein decompiling includes processing the executable or the binary code segment using a machine learning algorithm trained according to any of clauses A-G.
I. A non-transitory computer-readable medium storing a computer program, which, when read and executed by a computer causes the computer to perform a method of training a machine learning algorithm for decompiling binary code into readable source code, the method comprising:
  collecting a data set of source code and at least one element associated with the source code;
  providing binary code using the data set;
  training a model configured to decompile the binary code into source code using the data set by:
    decompiling the collected binary code into intermediate source code;
    comparing the source code in the data set with the intermediate source code; and
    updating the model and repeating the training if the source code in the data set differs from the intermediate source code by more than a threshold amount.
J. The non-transitory computer-readable medium of clause I, wherein the model is a sequence-to-sequence model.
K. The non-transitory computer-readable medium of clause I or J, wherein the threshold amount includes an error rate.
L. The non-transitory computer-readable medium of any of clauses I-K, wherein comparing includes comparing a fuzzy hash of the source code of the data set to a fuzzy hash of the intermediate source code.
M. The non-transitory computer-readable medium of any of clauses I-L, wherein the at least one element includes a programming language associated with the source code, a compiler name and version associated with the source code, target triplets, a compiler type associated with the source code, or compiler flags.
N. The non-transitory computer-readable medium of any of clauses I-M, wherein providing binary code using the data set includes compiling the source code in the data set using the at least one element.
O. The non-transitory computer-readable medium of any of clauses I-N, wherein the source code in the data set is compared with the intermediate source code with a loss function.
P. A system for training a machine learning algorithm for decompiling binary code into readable source code, the system having one or more processors configured for:
  collecting a data set of source code and at least one element associated with the source code;
  providing binary code using the data set;
  training a model configured to decompile the binary code into source code using the data set by:
    decompiling the collected binary code into intermediate source code;
    comparing the source code in the data set with the intermediate source code; and updating the model and repeating the training if the source code in the data set differs from the intermediate source code by more than a threshold amount.

Q. The system of clause P, wherein the model is a sequence-to-sequence model.

R. The system of clause P or Q, wherein the threshold amount includes an error rate.

S. The system of any of clauses P-R, wherein comparing includes comparing a fuzzy hash of the source code of the data set to a fuzzy hash of the intermediate source code.

T. The system of any of clauses P-S, wherein the at least one element includes a programming language associated with the source code, a compiler name and version associated with the source code, target triplets, a compiler type associated with the source code, or compiler flags.

What is claimed is:

1. A method of training a machine learning algorithm for decompiling binary code into readable source code, the method comprising:
   collecting a data set including source code in a programming language and at least one element associated with the source code;
   providing binary code using the data set;
   training a model configured to decompile the binary code into source code using the data set by:
      decompiling the collected binary code into intermediate source code in the programming language;
      comparing the source code in the data set with the intermediate source code; and
   updating the model and repeating the training if the source code in the data set differs from the intermediate source code by more than a threshold amount, and determining that the model is trained if the source code in the data set does not differ from the intermediate source code by more than a threshold amount.

2. The method of claim 1, wherein the model is a sequence-to-sequence model.

3. The method of claim 1, wherein the threshold amount includes an error rate.

4. The method of claim 1, wherein comparing includes comparing a fuzzy hash of the source code in the data set to a fuzzy hash of the intermediate source code.

5. The method of claim 1, wherein the at least one element includes the programming language associated with the source code, a compiler name and version associated with the source code, target triplets, a compiler type associated with the source code, or compiler flags.

6. The method of claim 1, wherein providing binary code using the data set includes compiling the source code in the data set using the at least one element.

7. The method of claim 1, wherein the source code in the data set is compared with the intermediate source code with a loss function.

8. The method of claim 1, further comprising:
   receiving an executable file or a binary code segment identified within a file;
   receiving identifying information associated with the executable file or the binary code segment; and
   decompiling the executable or the binary code segment using the identifying information
   by processing the executable or the binary code segment using the trained machine learning algorithm.

9. A non-transitory computer-readable medium storing a computer program, which, when read and executed by a computer causes the computer to perform a method of training a machine learning algorithm for decompiling binary code into readable source code, the method comprising:
   collecting a data set including source code in a programming language and at least one element associated with the source code;
   providing binary code using the data set;
   training a model configured to decompile the binary code into source code using the data set by:
      decompiling the binary code into intermediate source code in the programming language;
      comparing the source code in the data set with the intermediate source code; and
   updating the model and repeating the training if the source code in the data set differs from the intermediate source code by more than a threshold amount, and determining that the model is trained if the source code in the data set does not differ from the intermediate source code by more than a threshold amount.

10. The non-transitory computer-readable medium of claim 9, wherein the model is a sequence-to-sequence model.

11. The non-transitory computer-readable medium of claim 9, wherein the threshold amount includes an error rate.

12. The non-transitory computer-readable medium of claim 9, wherein comparing includes comparing a fuzzy hash of the source code of the data set to a fuzzy hash of the intermediate source code.

13. The non-transitory computer-readable medium of claim 9, wherein the at least one element includes the programming language associated with the source code, a compiler name and version associated with the source code, target triplets, a compiler type associated with the source code, or compiler flags [ ].

14. The non-transitory computer-readable medium of claim 9, wherein providing binary code using the data set includes compiling the source code in the data set using the at least one element.

15. The non-transitory computer-readable medium of claim 9, wherein the source code in the data set is compared with the intermediate source code with a loss function.

16. A system for training a machine learning algorithm for decompiling binary code into readable source code, the system having one or more processors configured for:
   collecting a data set including source code in the programming language and at least one element associated with the source code;
   providing binary code using the data set;
   training a model configured to decompile the binary code into source code using the data set by:
      decompiling the binary code into intermediate source code in the programming language;
      comparing the source code in the data set with the intermediate source code; and
   updating the model and repeating the training if the source code in the data set differs from the intermediate source code by more than a threshold amount, and determining that the model is trained if the source code in the data set does not differ from the intermediate source code by more than a threshold amount.

17. The system of claim 16, wherein the model is a sequence-to-sequence model.

18. The system of claim 16, wherein the threshold amount includes an error rate.

19. The system of claim 16, wherein comparing includes comparing a fuzzy hash of the source code of the data set to a fuzzy hash of the intermediate source code.

20. The system of claim 16, wherein the at least one element includes the programming language associated with the source code, a compiler name and version associated with the source code, target triplets, a compiler type associated with the source code, or compiler flags.

\* \* \* \* \*